United States Patent

[11] 3,585,442

[72] Inventors Achim Krusche
Wendezelle;
Horst Rohmann, Braunschweig, Germany
[21] Appl. No. 794,193
[22] Filed Jan. 27, 1969
[45] Patented June 15, 1971
[73] Assignee Rollei-Werke Franke & Heidecke
Braunschweig, Germany
[32] Priority Feb. 7, 1968
[33] Germany
[31] P 16 22 324.8

[54] FLASHLAMP CIRCUIT HAVING AUTOMATIC LIGHT TERMINATION MEANS
9 Claims, 3 Drawing Figs.
[52] U.S. Cl. ............................................. 315/151,
250/217, 315/159, 315/183, 315/230, 315/241
[51] Int. Cl. ............................................. G01j 1/46,
H05b 41/32
[50] Field of Search ............................................. 315/151,
152—154, 159; 250/217; 307/311; 328/75, 79,
130, 191, 193, 197, 201, 206, 207

[56] References Cited
UNITED STATES PATENTS
| | | | |
|---|---|---|---|
| 2,892,966 | 6/1959 | Smyth | 315/159 X |
| 3,340,426 | 9/1967 | Elliott | 315/151 |

*Primary Examiner*—Roy Lake
*Assistant Examiner*—E. R. LaRoche
*Attorneys*—Charles Shepard and Stonebraker and Shepard ABSTRACT: A flash tube has its flash extinguished by operation of a quench tube or switch tube which, when operated, short circuits the flash tube. The quench tube is set into operation (to stop the flash of the flash tube) by photoelectric measuring means responsive to the light reflected from the subject being photographed, when such reflected light reaches a threshold value. To avoid undesired short circuiting by operation of the quench tube as a result of light originating at some other flash apparatus located nearby, rather than the flash apparatus which the photographer desires to use, the circuit for igniting the quench tube is interconnected to the circuit of the flash tube so that the quench tube cannot be ignited except while the flash tube is flashing. This avoids undesired short circuiting discharge of the capacitor which powers the flash of the flash tube.

FLASHLAMP CIRCUIT HAVING AUTOMATIC LIGHT TERMINATION MEANS

BACKGROUND OF THE INVENTION

For photographic flashlight purposes and other purposes where intense light is needed for a limited time, it is known to use flash tubes which are electronically fired, and it is also known to employ a light-responsive circuit to terminate the flash when sufficient light has been produced to serve the intended purpose (e.g., sufficient light to make the desired exposure on a photographic film). Examples of such arrangements are the constructions disclosed in Elliott U.S. Pat. No. 3,340,426, granted Sept. 5, 1967, and in Erickson U.S. Pat. No. 3,350,603 and No. 3,350,604, both granted Oct. 31, 1967.

The present invention may be regarded as an improvement on the arrangement disclosed in the patents just mentioned, and the present disclosure proceeds on the assumption that the reader is already familiar with the patents just mentioned, so that features described in said patents or which will be obvious from said patents, need not be described in detail herein.

In said patents, and more particularly in the Elliott patent, there is provision for terminating a flash in progress in a flash tube, by short circuiting the flash circuit through ignition or firing of a quench tube, also sometimes called a switch tube, this short circuiting means being responsive to light reflected from the subject being photographed. If there is no other flash source in the vicinity of the subject, except only the flash apparatus being considered, the prior art arrangement as shown in said patents may be satisfactory for its intended purpose. But if another source of flash is in the vicinity (e.g., two or more photographers standing side-by-side to photograph the same subject) then the light originating at an entirely different flash apparatus, reflected from the subject, may trigger the quench tube and thus short circuit the flash tube of a different photographer's flash apparatus, thereby discharging the capacitor of the flash tube. This is undesirable both because it renders the short circuited flash tube temporarily inoperative, until its capacitor has been recharged, and because it represents a waste of energy, uselessly discharging the capacitor, thereby putting an unnecessary drain on the battery or other source of current which charges the capacitor.

An object of the present invention is the provision of a generally improved and more satisfactory flash apparatus.

Another object of the invention is the provision of flash apparatus so designed and constructed as to minimize or completely avoid the undesired short circuiting of a flash tube of one flash apparatus, as a result of light originating from a different flash apparatus.

Still another object is the provision of flash apparatus having means responsive to light reflected from the subject, for short circuiting a flash tube to terminate the flash thereof when the light produced by the flash reaches a predetermined threshold value, the short circuiting means being operative only while a flash is in progress in the associated flash tube, and being inoperative to short circuit the flash tube while no flash is in progress therein.

BRIEF DESCRIPTION OF THE DRAWINGS

The detailed disclosure is given by way of illustrative example only, rather than as a limitation. In the accompanying drawings, incorporated herein by reference and constituting a material part of the disclosure.

DESCRIPTION OF THE PREFERRED EMBODIMENTS

Figure 1:
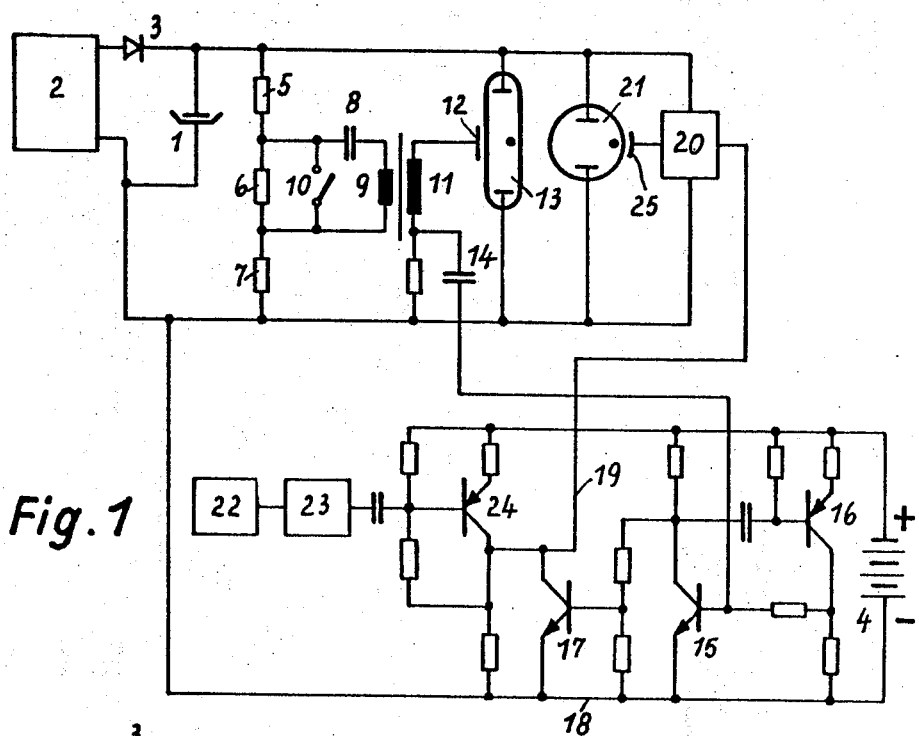
FIG. 1 is a circuit diagram illustrating schematically one form of the present invention.

Referring to the first embodiment of the invention as illustrated in FIG. 1, the high tension storage capacitor 1 is charged from a suitable source such as the direct voltage concerter 2, through the diode 3. For the lower voltage part of the circuit, a battery 4 is provided. The tube ignition voltage is tapped off of the voltage divider 5, 6, 7. The resistor 6 of this voltage divider is connected in series with the capacitor 8 and the primary winding 9 of the ignition transformer, so that the capacitor 8 is charged. Upon closing the release contact or firing contact 10, the capacitor 8 is discharged through the primary winding 9 of the transformer. The high tension surge thus occurring in the secondary winding 11 of the transformer causes the electrode 12 to ignite the flash tube 13. The firing contact or switch 10 may be, for example, the usual switch contact normally found in modern photographic shutters, closed in synchronism with the opening of the shutter blades to make an exposure.

The ignition impulse occurring in the high tension secondary winding 11 of the transformer is conveyed not only to the tube firing electrode 12, but also through the capacitor 14 to a univibrator, the monostable flip-flop 15, 16, which is connected with the base of the transistor 17 in the manner shown. The transistor 17 is normally conductive, so that it serves as a short circuit between the conductor 18 and the conductor 19 which leads to the ignition circuit shown schematically at 20. This ignition circuit is known per se, and serves to ignite the quench tube 21, which may also be called the switch tube or the extinguishing tube. This quench tube 21 is connected in parallel with the flash tube 13, as plainly shown in FIG. 1. It is known in the art and explained in said prior patents, that the quench tube 21 must have an impedance substantially less than that of the flash tube 13. Thus if the quench tube 21 is fired, it furnishes a low impedance short circuit of the tube 13, thereby discharging the capacitor 1 and terminating any flash then occurring in the tube 13. The firing electrode of the quench tube 21 is shown at 25, and is energized in known manner by the ignition circuit 20.

The arrangement also includes light responsive means, responsive to light reflected from the subject, for producing an ignition impulse to ignite the quench tube 21 when the light reflected from the subject reaches a predetermined threshold value. This means responsive to the reflected light includes a photoelectric converter known per se and schematically indicated at 22, and the integrator also known per se and schematically indicated at 23. When the received light falling on the converter 22 from the subject, reaches the desired threshold value, the transistor 24 passes the signal to the conductor 19 leading to the ignition circuit 20. If this signal reaches the ignition circuit 20, the firing electrode 25 will be activated and the quench tube 21 will be fired. However, it will be remembered that the transistor 17 is normally conductive and serves to short circuit the conductor 19 to the conductor 18, so that the impulse or signal coming from the elements 22, 23, and 24 cannot reach the ignition circuit 20.

But when the firing impulse of the flash tube 13, produced in the transformer winding 11, is conveyed also through the capacitor 14 to the flip-flop 15, 16, this actuates the univibrator flip-flop 15, 16 so that the latter renders the transistor 17 nonconductive at least for the duration of the discharge of the capacitor 1, that is, for the duration of the flash. Therefore, since the transistor 17 is nonconductive for the duration of the flash, the conductor 19 is no longer short circuited to the conductor 18 so long as the flash is in progress. Therefore during this time (i.e., while the flash of the tube 13 is in progress) the signal absorbed by the photoelectric converter 22 passes through the conductor 19 to the ignition circuit 20, and fires the tube 21 to stop the flash in the tube 13 at the appropriate time, when the received light from the subject reaches the desired threshold value.

It is seen from the foregoing that the light responsive means 22, 23, 24 which receives light reflected from the subject, is operatively connected to the quench tube firing circuit 20, in an effective manner, only while the flash tube 13 is flashing. During the flash, it can serve its intended purpose of determining the length of the flash in accordance with the light reflected from the subject being photographed. At all other times, however, the light responsive means 22, 23, 24 is operatively disconnected from the quench tube firing circuit 20 (by means of the short circuiting transistor 17) so that no matter how much light may be received by reflection from the subject (e.g., light from other flash apparatus in the hands of another photographer) the short circuiting quench tube 21 will not be operated and the capacitor 1 will not be unintentionally discharged. Thus there is no waste of energy stored in the capacitor 1 by undesired discharge when a flash is not in progress in the tube 13, and there is no temporary rendering of the flash tube 13 inoperative if it is desired to flash this tube at a very short interval after some other photographer has operated his flash apparatus.

In this embodiment of the invention, the flip-flop 15, 16 is coupled to the transformer winding 11 through a capacitive coupling, that is, the capacitor 14. It is equally possible, however, to use an inductive coupling or an ohmic coupling in place of the capacitive coupling.

Figure 2:
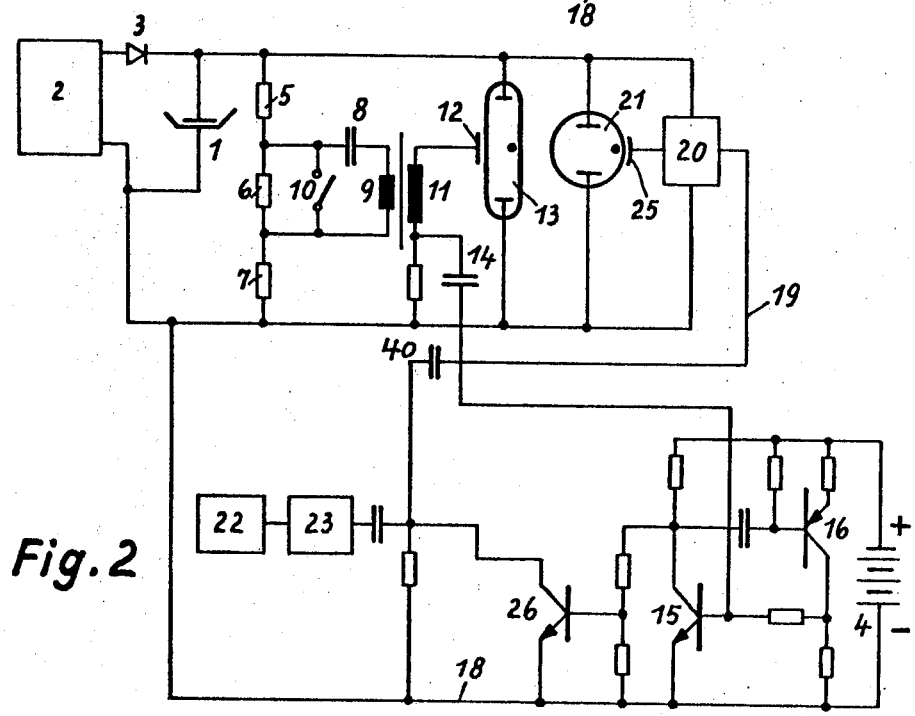
FIG. 2 is a similar view illustrating a second form of the invention.

In FIG. 2 there is shown a form of the invention which is basically the same, but with the circuit somewhat simplified. Those parts which are unchanged have the same reference numerals as in FIG. 1, and require no further description. The main difference is that a capacitor 40 has been inserted in the conductor 19 as shown, and the two transistors 17 and 24 have been replaced by a single transistor 26 which serves to short circuit the conductor 19 to the conductor 18 when the flash tube 13 is not flashing. Just as in the previous embodiment, the flash impulse which ignites the flash tube 13 will also operate the flip-flop 15, 16 to render the transistor 26 nonconductive, so that when the received-light signal from the elements 22, 23 exceeds the desired threshold value, it will operate the ignition circuit 20 to fire the quench tube 21.

In this embodiment of the invention the flip-flop requires no current until the switching process takes place, so that drain on the battery is saved.

Figure 3:
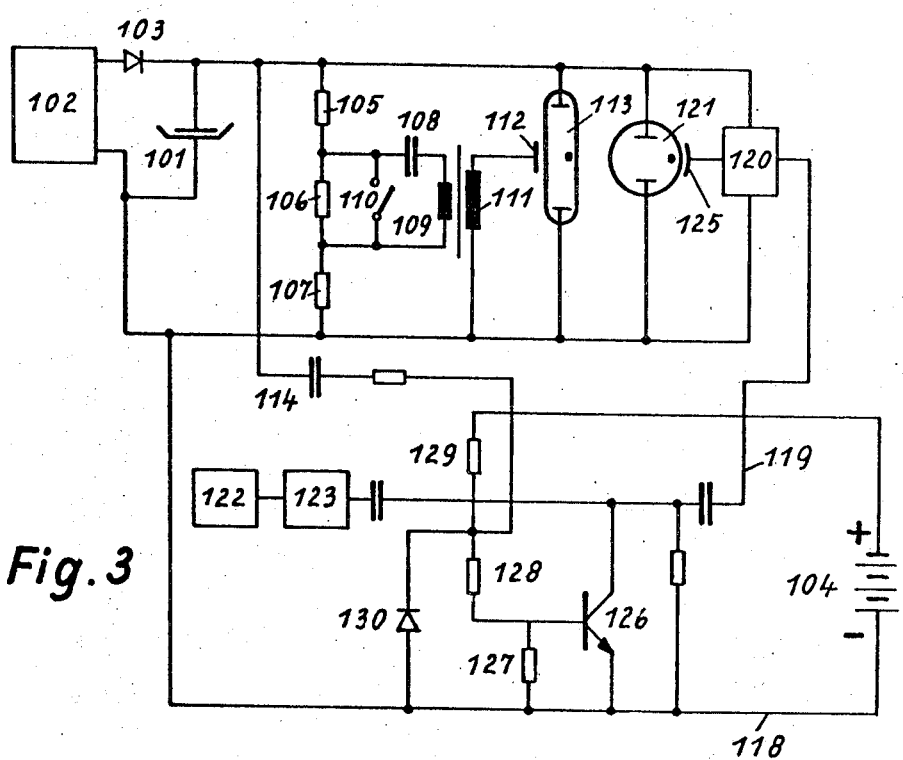
FIG. 3 is a similar view illustrating a third form of the invention.

A further embodiment is illustrated in FIG. 3, where corresponding parts have the same reference numerals previously used with the addition of 100 to each. Thus the storage capacitor shown at 1 in the previous embodiments is here indicated at 101, and so on. In this embodiment shown in FIG. 3, the control pulse is taken directly from the storage capacitor 101, and is conveyed via the capacitor 114 to the base of the transistor 126.

Through the voltage divider 127, 128, 129, the transistor 126 receives a positive bias voltage, so that the line 119 to the ignition circuit 120 is thereby kept short circuited. When the flash tube 113 is ignited, a negative voltage impulse, almost down to zero potential, occurs in the storage capacitor 101. This impulse reaches the base of the transistor 126 and blocks it. The time constant of the base circuit elements is selected to insure that the blocking of the transistor 126 lasts for the entire duration of the discharge of the storage capacitor 101, so that it is only during this period that the impulse from the light responsive measuring elements 122, 123 can pass through to the quench tube igniting circuit 120.

The diode 130 serves as a protection for the transistor 126. Here again, the transistor 126 can be preceded, if desired, by an impulse former such as a flip-flop, as in the previous embodiments.

If the flip-flop 15, 16 is designed with sufficient sensitivity, it is possible to insure, with very moderate switching action, that the flip-flop is actuated elsewhere by the ignition impulse present as an interference impulse.

It is thus possible, with very moderate switching action, to insure that the apparatus is reliably protected from interference influences emanating from extraneous flash apparatus.

What we claim is:

1. Flashlamp apparatus comprising flash tube, a storage capacitor for storing energy to sustain a flash in said flash tube, means for initiating a flash in said flash tube, short circuiting means operatively connected in parallel with said flash tube and serving, when actuated, to discharge said capacitor and terminate any flash then in progress in said flash tube, light measuring means responsive to light received from a subject for generating a measuring impulse when the received light reaches an adjustable threshold value, said impulse when reaching said short circuiting means serving to actuate said short circuiting means, and switching circuit means effective to convey said measuring impulse to said short circuiting means substantially only during the time that a flash in said flash tube is in progress and to block said measuring impulse from reaching said short circuiting means at other times, said switching circuit means being normally effective to block said measuring impulse from reaching said short circuiting means and being rendered effective to convey said measuring impulse to said short circuiting means by a starting pulse when a flash is initiated in said flash tube, independently of light falling upon said switching circuit means.

2. A construction as defined in claim 1, wherein said short circuiting means includes a quench tube connected in parallel with said flash tube and having lower impedance than said flash tube, and quench tube firing means operated by an incoming measuring impulse to fire the quench tube to short circuit the flash tube and discharge said storage capacitor.

3. A construction as defined in claim 1, further including transformer means for initiating a flash in said flash tube, said switching circuit means being responsive to operation of said transformer means.

4. A construction as defined in claim 1, wherein said switching circuit means includes a transistor (17 or 26) controlled by a flip-flop (15, 16).

5. A construction as defined in claim 1, wherein said switching circuit means is controlled by said storage capacitor.

6. Apparatus as defined in claim 1, wherein said means for initiating a flash includes a transformer having a low voltage circuit and a high voltage circuit, and wherein said switching circuit means is connected to and the starting pulse thereof is derived from the high voltage circuit of said transformer.

7. Apparatus as defined in claim 1, wherein the starting pulse of said switching circuit means is derived from said storage capacitor.

8. Flashlamp apparatus comprising a flash tube having a high voltage firing circuit for initiating a flash in said flash tube, a storage capacitor for storing energy to sustain a flash in said flash tube, pulse producing means responsive to incoming light for producing a pulse when the quantity of incoming light exceeds a threshold value, means responsive to a pulse for extinguishing a flash in said flash tube, a conductor for conveying a pulse from said pulse producing means to said pulse responsive means, and switching means controlled by said high voltage firing circuit for permitting a pulse to be conveyed through said conductor when said high voltage firing circuit is actuated to initiate a flash and to be conveyed a short time thereafter, and for preventing a pulse from being conveyed through said conductor at other times.

9. Apparatus as defined in claim 8, wherein said means for extinguishing a flash in said flash tube includes means for discharging energy remaining in said storage capacitor, otherwise than through said flash tube.